United States Patent [19]

Neuper

[11] Patent Number: 5,028,370

[45] Date of Patent: Jul. 2, 1991

[54] ELECTRODE MANUFACTURE AND SUPPORT MATERIAL

[76] Inventor: Christel Neuper, Winkelfeldgasse 8, A-8793 Trofaiach, Steiermark, Austria

[21] Appl. No.: 216,145

[22] Filed: Jul. 7, 1988

[30] Foreign Application Priority Data

Feb. 19, 1988 [AT] Austria .................................. 400/88

[51] Int. Cl.[5] .............................................. C04B 35/00

[52] U.S. Cl. ...................................... 264/105; 264/125

[58] Field of Search .......................... 264/57, 105, 125; 423/448

[56] References Cited

U.S. PATENT DOCUMENTS 2,235,504 3/1941 Rennie ................................ 264/57

2,974,374 3/1961 Tate .................................... 264/57

FOREIGN PATENT DOCUMENTS 3425058 2/1986 Fed. Rep. of Germany .

*Primary Examiner*—James Derrington

*Attorney, Agent, or Firm*—Herbert Dubno

[57] ABSTRACT

Electrodes and especially graphite electrodes for metallurgical purposes are supported during the sintering process in a granular support material consisting of coal-mining debris which preferably is thermally distilled, expanded clay or clinker.

16 Claims, 2 Drawing Sheets

ELECTRODE MANUFACTURE AND SUPPORT MATERIAL

FIELD OF THE INVENTION

My present invention relates to the use of thermally distilled mineral matter, especially coal-mining detritus, for example the tailings (waste washings) of drift-type coal mining, the rubble of open pit coal mining and the like, debris from other types of coal mining, expanded clay and clinker for the support material in an electrode production process (especially for graphite-electrode production), to the production of electrodes utilizing such granular materials to support an electrode blank during sintering, and to support material compositions in combination with a sintering form for electrodes.

BACKGROUND OF THE INVENTION

In the manufacture of electrodes and especially graphite electrodes, for use in electrometallurgy, e.g. in an electrosmelting furnace, or as electrodes for the production of aluminum in fused-bath electrolysis cells, the electrode blank which is insufficiently coherent and selfsupporting is supported in a sintering form by a support material filling the space between the electrode blank and the wall of the form or firing chamber.

The electrode blank which may undergo a transformation during the firing operation to a soft state through a doughy consistency, must be supported during this period and until the blank develops a sufficient stiffness so as to be self-supporting.

The choice of a support material has been conditioned in the past by a variety of factors and it is known, for example, that moisture content, particle size, bulk density or bulk weight (bulk specific gravity), abrasion resistance and glow or ignition losses are among the factors which must be considered for selection of a material which can be effectively employed as a support during the sintering process.

The moisture content can be measured in percent-by-weight of the material under consideration. The bulk density or bulk weight can be determined by filling the material without packing into a standardized volume and measuring the weight thereof, the bulk density or bulk weight being generally given in terms of kilograms/liter. The particle size can be given in milimeters for the granular material.

The abrasion characteristic can be given in terms of the resistance of the granular material to deterioration in use to fines which are much smaller in particle size than the granular material originally used. The glow or ignition loss is that fraction of the material which is transformed into the gaseous state during the sintering process.

The support material which has been utilized for this purpose in the past has generally been egg coke or crushed or screened oven coke. The glow or ignition loss in the use of such coke is very high and can equal or exceed 40% by weight which the coke had before the sintering began.

Quartz sand is also used frequently as a support material and is generally found to be unsatisfactory because of its low abrasion resistance.

During handling of the quartz sand, storage, shoveling into the forms, etc., the quartz sand tends to break down to form a substantial fraction with a particle size below 3 mm which cannot be tolerated in the support material. In addition, quartz sand has a high bulk density or bulk weight which makes handling more difficult and reduces the economy of transport of the material.

OBJECTS OF THE INVENTION

It is the principal object of the present invention, therefore, to provide an improved method of making electrodes (preferably graphite electrodes), especially as regarding the sintering step in the process, whereby drawbacks of earlier approaches are avoided.

Another object of my invention is to provide an improved material for use as a support material for the blank in electrode manufacture (especially graphite electrode manufacture) during the firing or sintering thereof when the blank may soften.

Yet another object of this invention is to provide a new use for mining detritus, especially coal-mining detritus (waste washings), expanded clay and clinker.

SUMMARY OF THE INVENTION

Now it has been discovered that mining detritus or tailings, rubble and the like and mineral matter, expanded clay and clinker form effective granular materials individually or in mutual admixtures, in the production of electrodes (especially graphite electrodes), especially for electromelting furnaces.

The term "rubble" is used herein to refer to mining debris such as the rubble in open pit coal mining, the residue from coal picking, i.e. tailings (waste washings) from pit and shaft mining, and waste washing mining debris formed by the separation of coal from mined products in water. This rubble is largely free from coal. The rubble may have accumulated in piles in connection with mining and may be recovered from such piles. It also may be freshly produced in a mining operation.

The term "detritus" is used herein to refer to the rubble as thus described, as well as tailings (waste washings) which have been subjected to a thermal distillation by spontaneous combustion or thermal spontaneous decomposition in piles of tailings (waste washings) as will be described. Of course, the tailings (waste washings) can be subjected to a thermal treatment, usually a low-oxygen thermal treatment from which volatiles are distilled from the tailings.

In addition to the mining detritus as thus defined, expanded clay can be used which is a low-lime clay which can be burned or fired in a shaft or rotary furnace and can, if desired, be transformed into clinker.

According to the invention, the method of making an electrode especially a graphite electrode, includes the step of embedding the electrode blank in a sintering form, filling the space between the walls of the sintering form and the electrode blank with the support material of the invention, and firing (sintering) the blank as supported by this material.

The invention also comprehends the new use of the granular support material as described and the material itself in combination with an electrode sintering form or firing chamber.

According to the invention, the moisture content of the material, when freshly inserted into the sinter form or used should not exceed 15%. A higher moisture content is disadvantageous, firstly because it requires considerable energy to drive off the water, and secondly the development of the water vapor can cause breakdown of the granules, resulting in premature abrasion, and a large proportion of unusable fine-grain particles.

The moisture content can be determined from the weight loss in subjecting the material to a drying step. Preferably, the material is heated for about 12 hours at 120° C. in a drying oven. The weight loss in percent is considered to be the moisture content of the material prior to the drying treatment. After the material has once been used, of course, the sintering process itself, within the firing furnace, will cause the water to be driven off and thereafter the granular material can be used without concern as to its moisture content.

The granular support materials of the invention have been found to have excellent abrasion-resistant characteristics so that in the handling of the granular material by filling it into the form, transporting the granular material, sieving the granular material and like handling steps only a minuscule amount of material is lost by the formation of a fine-grain, nonusable component.

The granular material of the invention is also characterized by a particularly effective particle configuration since the particles or granules have relatively few peaks or sharp edges. Expanded clay, especially, can be seen to have a ball-like particle shape which is especially effective from an abrasion-resisting viewpoint.

The abrasion characteristics can be determined by analogy with the tests used for the abrasion characteristics of bituminous-coal coke according to German Industrial Standard DIN 51 717.

The glow or ignition losses of the granular support materials described even in the case of mining debris which has not been subjected to thermal degradation, is relatively small. This is because the carbon content of the coal mining detritus is low from the sorting and separation of coal from the mining debris before the detritus is dumped upon the tailing piles.

According to the invention, the granular support material should have a particle size of substantially 3 to substantially 10 mm and a bulk density or bulk weight which preferably is less than 1 kg/liter.

This will ensure that the fine-grain component (particle size below 3 mm) will only be present in a small amount and thus cannot detract from the support function. It may be noted that a high fine-grain percentage will be detrimental because the fine-grain component tends toward baking of the particles together. Furthermore, a fine-grain component, upon transport, contributes to loss of the granular material in dust which may be released into the environment and may therefore be an intolerable pollutant.

The bulk density or bulk weight below 1 kg/liter allows filling of the space within the form with a much smaller weight of material by comparison with materials whose bulk density or bulk weight exceeds 1 kg/liter. The low-bulk density or low-bulk weight also contributes to energy saving when compared with support materials having a bulk density or bulk weight significantly greater than 1 kg/liter. The mining detritus used in accordance with the invention has a bulk density or bulk weight of about 0.98 kg/liter while the expanded clay and clinker may have a bulk density or bulk weight of 0.72 kg/liter.

Preferably the granular support material, whether in the form of the distilled tailings, mining rubble or undistilled tailings (waste washings) or expanded clay, consists of a first component constituting 75 to 90% by weight of the granular material and consisting of a mixture of silicon, aluminum and iron oxides. The second component ranging in amount from 10 to 25% by weight of the granular support material consists essentially of at least one of the elements from the group consisting of calcium, magnesium, potassium, titanium and sodium in the form of an oxide and optionally a phosphorous oxide thereof. The phosphorous oxide can have various links between phosphorous and oxygen.

In addition, the second component may have up to 1.5% by weight sulfur and/or 3 to 4% by weight carbon.

The carbon and sulfur content, of course, will depend upon the degree of thermal distillation of the tailings (waste washings) from open-pit or shaft or gallery mining. The preferred materials are those which are obtained from tailing piles and shaft and gallery coal mines or open-pit mines in which under the high pressure of such piles an internal combustion is sustained, usually for decades. The resulting material is thus thermally distilled within the pile and is porous but nevertheless has sufficient strength and abrasion resistance for use as a support material.

The wear characteristics of the granular support material, namely, the coal-mining detritus, the expanded clay and the clinker should be selected so that in use, at most there is a 10% increase of the particle size fraction smaller than 3 mm. The glow or ignition loss measured over six hours at 650° C. should not exceed 10%.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
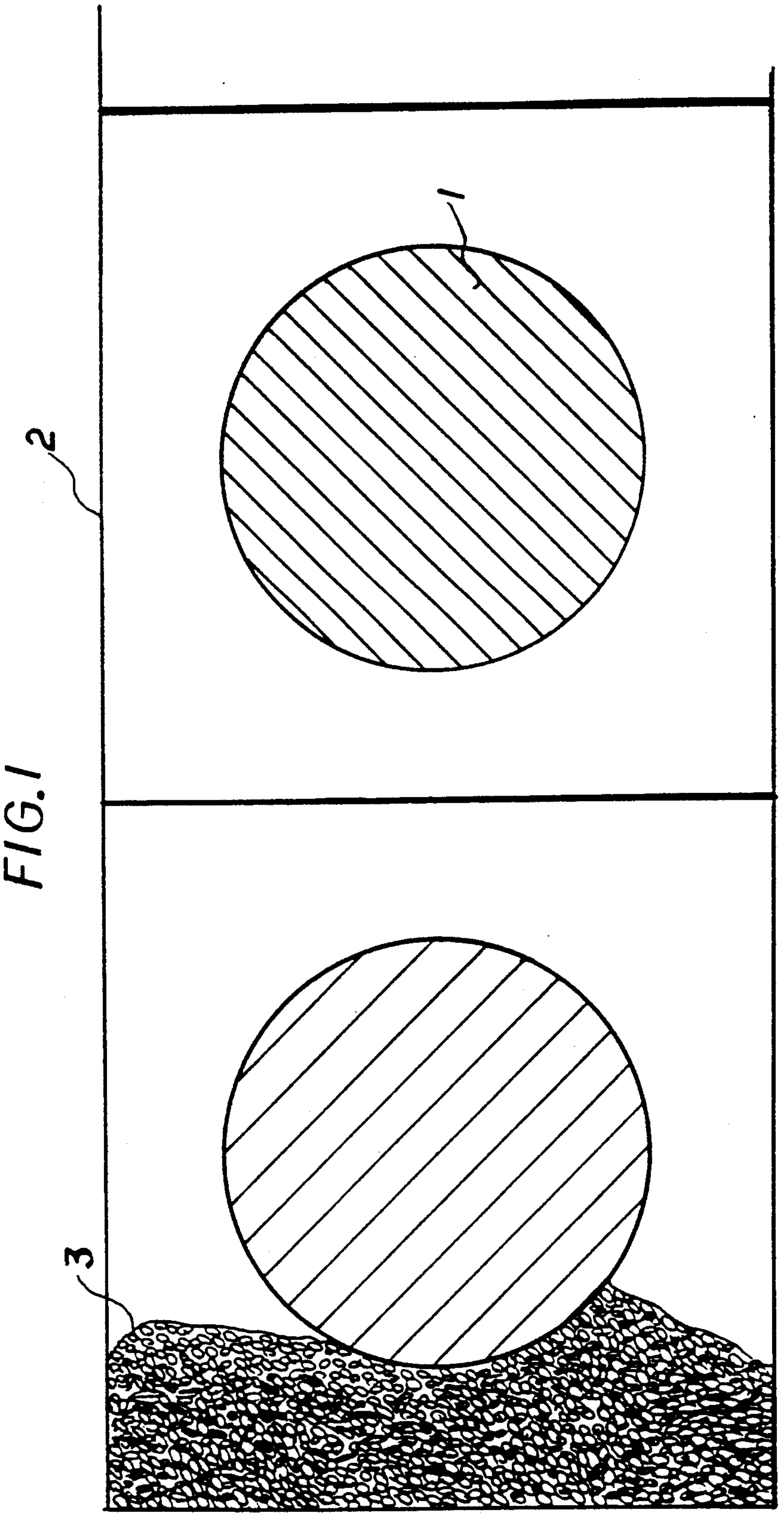
FIG. 1 is a diagrammatic cross-sectional view showing the formation of graphite electrodes with circular cross section in accordance with the invention.
Figure 2:
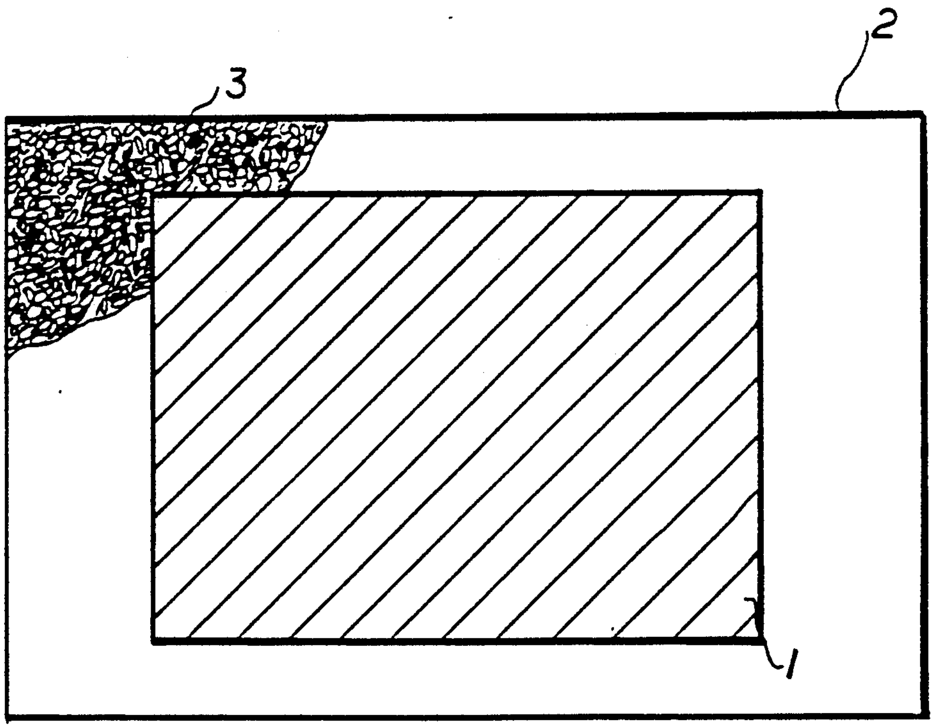
FIG. 2 is a diagrammatic section showing the formation of an electrode of rectangular cross section.

FIGS. 1 and 2 show in highly diagrammatic form the cross section of a sinter box, form or mold in which the electrode blanks are to be sintered. In FIG. 1, the electrodes are of circular cross section while in FIG. 2 the electrodes are of rectangular cross section. In these FIGURES, the electrode blank is represented at 1, the walls of the form are seen at 2 and a body of a granular support material 3 is provided between the walls of the form 2 and the blank 1. This granular support material is, in accordance with the invention, thermally-distilled mining debris tailings (waste washings) or rubble or diluvial coal-mining residues, or expanded clay or clinker.

In FIG. 1 of the drawing, only one of the blanks is shown to be embedded in the support 3 while in FIG. 2 only part of the form is seen to be filled with the support material, for drawing simplification, although it will be understood that in practice the support material entirely fills the spaces between the electrode blank and the walls of the form.

The granular support material thus defines the cavity in which each electrode blank is received.

SPECIFIC EXAMPLES

EXAMPLE 1

From the tailings (waste washings) pile or tip of an antracite-coal mine, thermally distilled tailings (waste washings) are removed, the tailings (waste washings) having been heated by spontaneous combustion over a period of decades. These distilled tailings (waste washings) are to a particle size between 3 and 10 mm and screened so that in the granular material which is to be used as the support material, the fraction with a particle size less than 3 mm makes up less than 6%.

The granular material is used as a support material as described in connection with FIGS. 1 and 2 for graphite-electrode blanks and especially for cylindrical graphite-electrode blanks which are sintered in the support material. The support material has a bulk density or bulk weight of 0.98 kg/liter and a moisture content of about 8.3%. The material has the following composition:

| | |
|---|---|
| $SiO_2$ | 51 weight-% |
| $Al_2O_3$ | 22 weight-% |
| $Fe_2O_3$ | 11 weight-% |
| CaO | 3 weight-% |
| MgO | 2 weight-% |
| $K_2O$ | 3 weight-% |
| $Na_2O$ | 1 weight-% |
| $P_2O_5$ | 1 weight-% |
| $TiO_2$ | 1 weight-% |
| S | 1 weight-% |
| C | 4 weight-% |

The material has good abrasion properties and the glow or ignition loss after heating at 650° C. for six hours is 2.2% by weight, covered mostly by the carbon content of the material.

After use for the sintering of electrodes, especially graphite electrodes, the material can be reused directly and the glow or ignition loss decreases as a function of the reduction in the carbon content during former use.

EXAMPLE 2

Expanded clay is comminuted and sieved to a particle size between 3 and 10 mm, the fraction below 3 mm in particle size making up less than 6% of the granular material. The granular material is used as a support material as described in Example 1 for electrode sintering. The moisture content is 1% and the bulk density or bulk weight 0.72 kg/liter. The composition of the expanded clay is as follows:

| | |
|---|---|
| $SiO_2$ | 54 weight-% |
| $Al_2O_3$ | 22 weight-% |
| $Fe_2O_3$ | 8 weight-% |
| CaO | 2 weight-% |
| MgO | 3 weight-% |
| $K_2O$ | 9 weight-% |
| $Na_2O$ | 1 weight-% |
| $TiO_2$ | 1 weight-% |

The loss in energy resulting form evaporation of moisture from the support material is practically negligible, amounting to the equivalent of one liter of fuel oil per ton of the support material used.

The granules are practically spherical and as a result the abrasion properties (abrasion resistance) are good. Glow or ignition loss is negligible since the material contains little if any volatile components and combustible components respectively.

I claim:

1. In a method of making an electrode for use in electrometallurgy or aluminum fused-bath electrolysis cells, the improvement which comprises the steps of:
   (a) supporting an electrode blank in a sintering form in a body of a granular support material which is a coal-mining rubble which has been subjected to long-term thermal distillation or low-temperature carbonization; and
   (b) sintering said electrode blank to a selfsupporting electrode in said body of said granular support material.

2. In a method of making an electrode for use in electrometallurgy or aluminum fused-bath electrolysis cells, the improvement which comprises the steps of:
   (a) supporting an electrode blank in a sinerting form in a body of a granular support material selected from the group which consists of mining detritus, expanded clay and clinker, said granular support material consisting essentially of:
   a mixture of oxides of silicon, aluminum and iron constituting 75% to 90% by weight of the granular support material; and
   another component of said granular support material constituting 25% to 10% weight of said granular support material, said other component consisting essentially of at least one oxide of an element selected from the group which consists of calcium, magnesium, potassium, sodium, and titanium, optionally an oxide of phosphorous, up to 1.5% by weight sulfur, and up to 4% by weight carbon; and
   (b) sintering said electrode blank to a selfsupporting electrode in said body of said granular support material.

3. The method defined in claim 2 wherein said granular material contains at least 3% and up to 4% by weight carbon.

4. The method defined in claim 2 wherein said granular support material has a particle size of 3 to 10 mm and a bulk weight of less than 1 kg/liter.

5. The method defined in claim 2 wherein said granular support material has a moisture content of less than 15% as supplied to said form.

6. The method defined in claim 2 wherein said electrode is a graphite electrode and said blank is a graphite electrode blank.

7. The use of a granular support material in manufacturing an electrode, especially electrometallurgy and aluminum fused-bath electrolysis cell electrodes, said use comprising the steps of:
   (a) selecting said granular support material from the group consisting of mining detritus, expanded clay and clinker; and
   (b) depositing said granular support material within a sinter form; and
   (c) placing an electrode blank in said sinter form so as to be supported by said granular support material and then sintering said blank.

8. The use defined in claim 7 wherein said granular support material consists essentially of:
   a mixture of oxides of silicon, aluminum and iron constituting 75% to 90% by weight of the granular support material; and
   another component of said granular support material constituting 25% to 10% by weight of said granular support material, said other component consisting essentially of at least one oxide or of an element selected from the group which consists of calcium, magnesium, potassium, sodium, and titanium, optionally an oxide of phosphorous, up to 1.5% by weight sulfur, and up to 4% by weight carbon.

9. The use defined in claim 8 wherein said granular material contains at least 3% and up to 4% by weight carbon.

10. The use defined in claim 8 wherein said granular support material has a particle size of 3 to 10 mm and a bulk weight of less than 1 kg/liter.

11. The use defined in claim 8 wherein said granular support material has a moisture content of less than 15% as supplied to said form.

12. In a method of making an electrode for use in electrometallurgy of aluminum fused-bath electrolysis cells, the improvement which comprises the steps of:

(a) supporting an electrode blank in a sintering form in a body of a granular support material selected from the group which consists of mining detritus and clinker, said granular support material consisting essentially of:

a mixture of oxides of silicon, aluminum and iron constituting 75% to 90% by weight of the granular support material; and another component of said granular support material constituting 25% to 10% weight of said granular support material, said other component consisting essentially of at least one oxide of an element selected from the group which consists of calcium, magnesium, potassium, sodium, and titanium, optionally an oxide of phosphorous, up to 1.5% by weight sulfur, and up to 4% by weight carbon; and (b) sintering said electrode blank to a selfsupporting electrode in said body of said granular support material.

13. The method defined in claim 12 wherein said granular material contains at least 3% and up to 4% by weight carbon.

14. The method defined in claim 12 wherein said granular support material has a particle size of 3 to 10 mm and a bulk weight of less than 1 kg/liter.

15. The method of claim 12 wherein said granular support material has a moisture content of less than 15% as supplied to said form.

16. The method defined in claim 12 wherein said electrode is a graphite electrode and said blank is a graphite electrode blank.

* * * * *